Jan. 30, 1962     F. W. KULICKE, JR     3,018,975
CONTINUOUS FINE WIRE FEEDING DEVICE
Filed March 12, 1960

INVENTOR
Frederick W. Kulicke, Jr.
BY
ATTORNEYS

United States Patent Office 3,018,975
Patented Jan. 30, 1962

3,018,975
CONTINUOUS FINE WIRE FEEDING DEVICE
Frederick W. Kulicke, Jr., Philadelphia, Pa., assignor to Kulicke & Soffa Mfg. Co., Philadelphia, Pa., a corporation of Pennsylvania
Filed Apr. 12, 1960, Ser. No. 21,773
11 Claims. (Cl. 242—54)

This invention relates to a wire feeding device, and more particularly relates to a device for continuously dispensing extremely soft and delicate fine wire from a spool.

The dispensing of extremely soft and fragile fine wire becomes a particularly difficult problem because of the tendency of such wire to kink, break, and in certain instances to adhere to itself or otherwise move out of control during handling. For example, gold wire having diameters ranging from 0.1 to 5 mils is required in the fabrication of transistors where the wire is bonded to crystal wafers, these operations usually being performed under microscopic observation and requiring a high degree of precision. This wire is also of a low tensile strength, approximately 7 grams for one mil diameter, and is very apt to tear with minor stresses imposed thereupon. It is particularly important not only to place the end of the wire with great accuracy upon the crystal surface, but also to cut or seal off a measured length thereof without fracturing or injuring the bonded portion or that wire still remaining on the spool.

Prior to the present invention, it was necessary to use Wollaston wire to handle wire of extremely small diameters, Wollaston wire consisting of a core of gold wire of the required diameter for the end application with a jacket of another material, such as silver or nickel, the total diameter ranging from five to ten mils. While it was possible to handle Wollaston wire through its outer jacket, this wire, as drawn, was in most cases too hard for the end use and had to be annealed to obtain the proper softness for optimum bonding. Usual devices for handling the Wollaston wire included holders in which measured lengths of the wire were cut to size and fitted within separate supporting sleeves with considerable expenditure of time.

Refinement in wire drawing techniques provided a supply of drawn wire in extremely fine diameters, for example, gold wire as small as 0.0004 inch. However, to dispense continuous lengths of this wire with the required degree of softness needed for optimum bonding resulted in the strands of the wire sticking to itself when wound on a conventional spool.

The present invention provides the means for handling, annealing and dispensing the extremely fine diameter drawn wire. One of the features of my feeding device is the provision for winding the wire upon a spool having a helical thread. With the wire in a hard condition as commercially available, it is possible to anneal the entire spool with the wire in situ and each coil separated so that adjacent layers will not bond to themselves.

It is therefore an object of this invention to provide a feeding device for continuously dispensing extremely fine wire of extremely low tensile strength from a spool.

Another object of this invention is to provide a continuous fine wire feeder wherein breaking or kinking of the wire will be minimized.

Another object of this invention is to provide a continuous fine wire feeding device for dispensing and accurately positioning a measured length of wire against a surface to which it is to be bonded.

Another object of this invention is to provide a feeding device for delivering fine, delicate wire from a spool wherein the wire will be maintained under constant gentle tension during advancement.

Another object of this invention is to provide a fine wire dispensing device which can be manipulated with great facility so that the wire can be advanced without flutter, or retracted, as desired, should an excessive length be inadvertently delivered.

Other objects of my invention are to provide an improved device of the character described that is easily and economically produced, which is sturdy in construction and which is highly efficient in operation.

With the above and related objects in view, this invention consists of the details of construction and combination of parts as will be more fully understood from the following detailed description, when read in conjunction with the following drawing in which.

Figure 1:
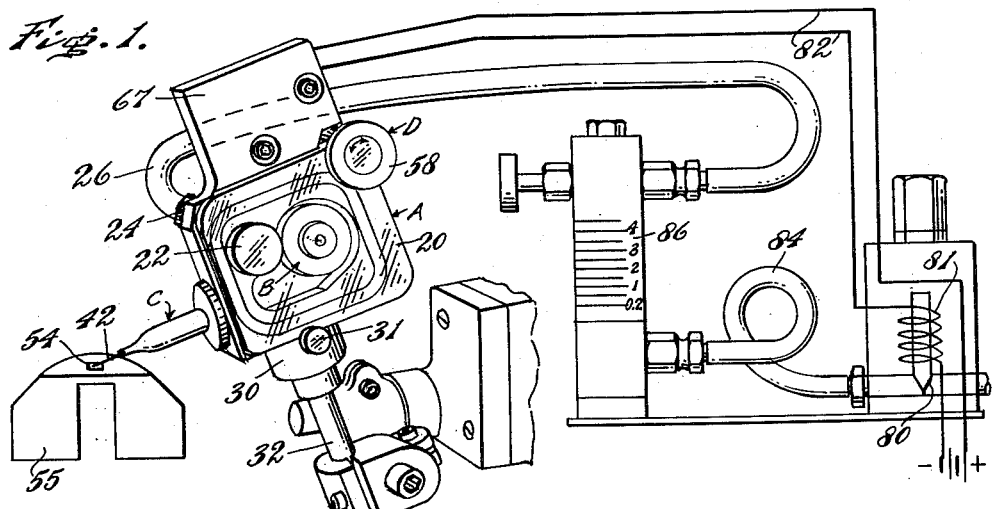
FIG. 1 is a perspective view of a fine wire feeding device embodying this invention.
Figure 2:
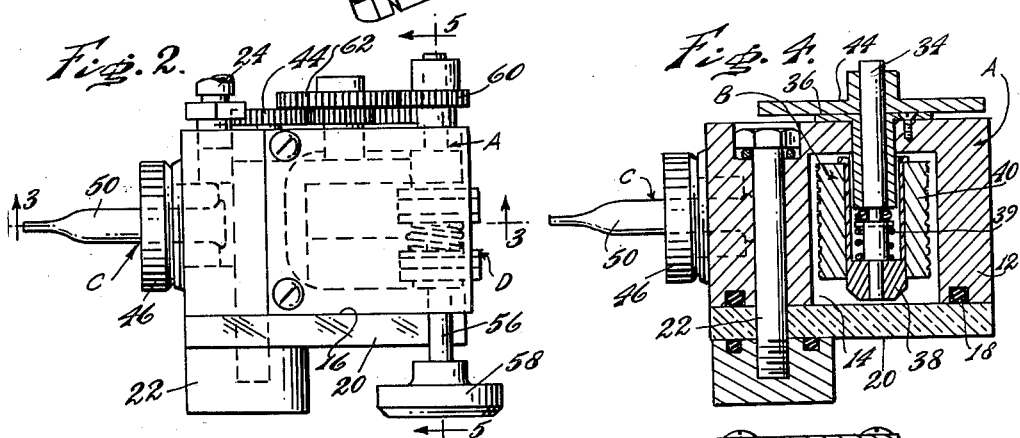
FIG. 2 is a top plan view thereof.

Referring now in greater detail to the drawing in which similar reference characters refer to similar parts, there is shown a continuous wire feeding device comprising a housing, generally designated as A, a wire carrying reel B, rotatably supported within said housing, an outlet nozzle generally designated as C, and a wire advancing assembly, generally designated as D, adapted to rotate the reel and simultaneously actuate a mechanism for introducing gas under pressure into said housing, whereby wire will be delivered from the reel under tension through the nozzle on a stream of the gas.

The housing A comprises a steel casing 12 of substantially cubic configuration having a chamber 14 therein extending through one side 16. An O-ring 18 is supported in a slot rectangularly oriented in the side 16 and a transparent cover plate 20, of suitable plastic such as Plexiglas (an acrylic resin) is pressure sealed against the O-ring by stud 22 to permit easy observation of the chamber and, at the same time, allow for hermetic closure thereof. The stud 22 has a knurled head which is conveniently rotated in either direction by finger pressure so that the cover plate 20 may be removed when it is desired to load or unload the reel B within the casing 12. A gas inlet fitting 24, to which is attached a tube 26 coming from a source of pressurized gas, is secured to the casing 12 and communicates with the chamber 14. A threaded outlet 28, extending into the chamber 14, is provided in the forward portion of the housing A and the nozzle C is adapted to be screwed thereinto. The lower portion of the housing A has a mounting collar 30 and thumb set screw 31 for securing the wire feeder to the stem of a holding stand 32.

Figure 4:
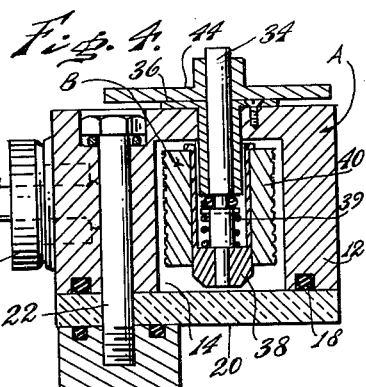
FIG. 4 is a sectional view taken along lines 4—4 of FIG. 3.
Figure 5:
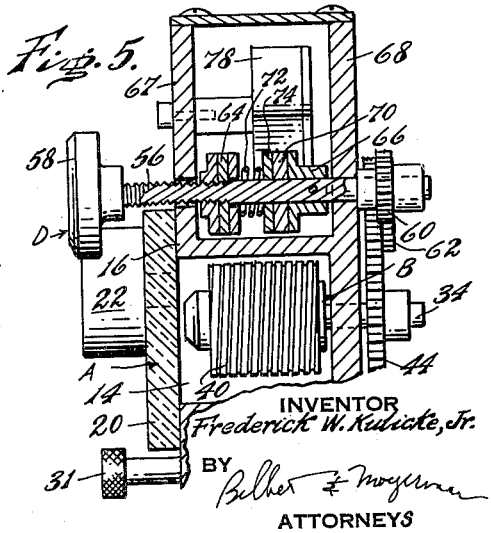
FIG. 5 is a sectional view taken along lines 5—5 of FIG. 2.

The reel B comprises a shaft 34 rotatably supported in a bushing 36 affixed within the casing 12 and a collet type spool stud 38 affixed upon the shaft and rotatable therewith inside the chamber 14. The bushing 36 is internally sealed by an O-ring spring assembly 39. A spool carrying wire 42 is detachably secured to the collet stud 38 and is unwound on rotation of gear 44 affixed to the exterior end of shaft 34. While any type spool of a size compatible with this feeder may be utilized, a special stainless steel spool having a fine helically ground thread in its cylindrical surface is preferred when the wire is extremely soft. In such a case, the wire is wound in a single layer within the helical tooth form with adjacent coils axially spaced by the threads to prevent sticking of adjacent wire filaments. It is also possible to anneal the entire spool with the wire already wound thereon without additional handling. As shown in FIGS. 4 and 5, the spool 40 has a left hand thread so that the start of the wire on the helical spool will be close to the operator. As the wire unwinds on the spool in the clockwise direction, it will uncoil away from the operator. This is significant when the nozzle C is pointed to the left in the manner shown to enable the operator to easily grasp the free end of the wire preparatory to threading through the nozzle as will be described hereinafter. If the unit had a nozzle pointing toward the right, then a right hand thread would be employed on the spool.

Figure 3:
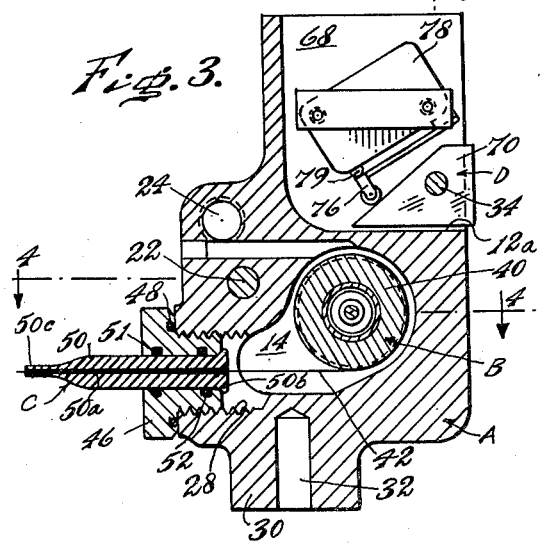
FIG. 3 is a sectional view taken along lines 3—3 of FIG. 2.

Referring to FIG. 3, the outlet nozzle C includes a knurled fitting 46 threadedly engaging within the outlet 28 and supporting a glass tubular tip 50 on O-rings 51 and 52 within the bore thereof. O-ring 48 mounted in the inner surface of the fitting head 46 completes the nozzle seals so that gas under pressure within the cavity will be expelled solely through the tip capillary bore 50a. The O-rings 48, 51 and 52 further provide a resilient mount for the nozzle assembly so that minor shock loadings will not cause breakage thereof. Glass tubing is preferred for the tip 50 because of its low frictional characteristics and facilitates feeding of the wire 42. The capillary bore 50a is of constant diameter, approximately 8 mils, for wire having a diameter of from 0.4 to 1 mil, and extends through the entire tip to enable passage of the wire therethrough together with the gas which tensions the wire. It has been found practicable to utilize a 10 mil bore for 2 mil wire and a 15 mil bore for 3 mil wire in order to yield maximum efficiency with this feeder. The inner end of the tip 50 is flared at 50b to facilitate threading of the wire into the tip, as will be described hereinafter, and also to reduce friction as the wire is being dispensed through the nozzle. The outer end of the tip is tapered to a needle point 50c so that the wire 42 may be conveniently positioned without view obstruction upon, for example, a transistor crystal 54 supported on a table 55, as shown in FIG. 1.

The wire advancing assembly D comprises a shaft 56 rotatably supported in the casing 12 and having a knurled feed knob 58 affixed to one end. The other end of the shaft 56 has a driving gear 60 which is coupled to reel gear 44 through an idler gear 62 whereby clockwise rotation of the feed knob 58 will rotate the reel B clockwise to deliver wire from the spool 40.

A pair of axially spaced collars 64 and 66 are affixed to the shaft 56 inboard of casing extensions 67 and 68. A nylon switch actuating cam 70, rotatable on the shaft 56, is urged against collar 66 by clutch spring 72 compressed between clutch plate 74 and the collar 64. The actuating cam 70 is trapezoidal in configuration as shown in FIG. 3. The diagonal surface thereof abuts against actuating finger 76 which is spring pivoted on microswitch 78 and adapted to close microswitch contactor 79. The bottom surface of the cam 70 normally abuts against the top wall 12a of the casing which acts as a stop therefore. The microswitch 78 is single pole, normally open and is supported intermediate casing extensions 67 and 68. A solenoid actuated gas valve has a solenoid 81 series connected by quick-disconnect leads 82 with the microswitch contacts across a line source such as 110 volts A.C. whereby closing of the contacts of microswitch 78 will open the valve 80. Opening of the valve 80 allows an inert gas under pressure, preferably 20 p.s.i., to pass into tube 84 and flowmeter 86 thereafter entering the casing chamber 14 through inlet tube 26. When the valve 80 is closed (microswitch contacts open), a bypass valve therein, but not shown, permits the gas within the casing 12 to be released immediately to the atmosphere so that the casing cavity 14 is only pressurized during advancement of the feed knob 58.

Clockwise rotation of the feed knob 58 causes the reel B to rotate clockwise also through gear train 60, 62 and 44 and advances the wire ¼ inch for each full turn of the knob. However, even the smallest clockwise rotation of the wire advancing assembly D will turn the switch cam 70 against spring finger 76 and move the latter into engagement with the contactor 79 to close the microswitch 78. The solenoid valve 80 will accordingly open permitting gas under pressure to be forced into the casing cavity 14. This gas will be expelled through the nozzle C to propel the wire 42 through the tip 50 and keep the wire taut.

Further advancement of the feed knob 58 will maintain the switch cam 70 in engagement with the contactor 79 although the cam will slide on the shaft 34 as permitted by the slip clutch assembly 72 and 74 when restricted by the bottom of the microswitch 78. Thus, the gas, which incidentally is preferably forming gas (hydrogen and nitrogen), will continue to flow at a rate of about 1 c.f.h. into the housing cavity 14 and out through the nozzle C as the wire is advanced to keep the wire under constant tension during delivery. The gear train 44, 60 and 62 gives the operator the desired sensitivity for delicate dispensing of the wire 42.

As soon as the operator releases the knob 58 from the forward feeding direction, i.e. clockwise, the spring finger 76 will depress against the cam 70 and cause the entire advancing assembly D to rotate counterclockwise a tiny fraction of a degree. Since no positive pressure is being imposed against the contactor 79 at this time, the microswitch 78 will open, and the gas flow will be automatically and immediately terminated. Thus, when wire feeding is stopped, gas flow through the nozzle C will also terminate and there will be no flutter of the wire end protruding from the tip 50. Relief of flutter enables the operator to bond the wire to the transistor crystal with a high degree of precision.

The wire may also be retracted, if desirable or necessary, by turning the feed knob 58 in a counterclockwise direction. This will produce reverse rotation of the gear train from that of advancement of the spool. During retraction, the clutch plate 74 will again slip as the cam 70 abuts against the surface 12a, in this instance. Contactor 79 will not be depressed, and microswitch 78 will remain open so that no gas will be introduced into the housing A at this time. It is thus to be observed that the total rotational movement of the cam 70 is quite small in order that gas will flow only during wire advancement and instantaneously with the inception thereof.

Loading of extremely delicate wire into this feeding device is accomplished by removing the cover plate 20 and the nozzle C from the casing 12. The wound spool is inserted upon the collet stud 38 with the free end of the wire left dangling from the left hand side of the spool as shown in FIG. 5. A vacuum hose (not shown) is inserted through the outlet opening 28 to suck up the hanging wire end beyond the housing wall. In this respect, the opening 28 is rather large so that the free end of the wire may be easily found with the vacuum hose technique. The vacuum hose is then inserted upon the nozzle tip 50 at the needle portion 50c, and the wire end is sucked through the flared end 50b into the bore 50a and threaded past the needle point 50c. Thereafter, with the hose still attached to the tip 50, the nozzle C is screwed back within the outlet 28 without losing control of the wire. The plate 20 is then mounted against wall 16.

As is apparent from the foregoing description, the fine wire will be dispensed from the spool continuously under gentle tension during advancement thereby minimizing breaking, kinking or loss of control thereof. If any fouling should occur within the casing, it will be immediately observable through the transparent cover 20. The flared or bell mouthed end 50b of the tip 50 reduces friction to a minimum when feeding the wire and facilitates threading of the wire into the nozzle C. The glass tubing also makes for low frictional impediment during feeding. The nozzle C is supported upon a resilient mount to alleviate damage if minor shocks should be imposed.

It is to be especially pointed out that the helically grooved spool design permits the use of commercially available wire which may be wound and annealed on the spool itself, thus making feasible the use of wire in a state of extreme softness without the wire sticking or bonding to itself during annealing or during dispensing.

Although this invention has been described in considerable detail, such description is intended as being illustrative rather than limiting, since the invention may be variously embodied, and the scope of the invention is to be determined as claimed.

What is claimed is:

1. A device for the continuous feeding of extremely fine wire comprising a housing having a chamber therein, a wire carrying spool rotatably supported in said housing, a nozzle having a bore communicating with the chamber, means for introducing gas under pressure into the chamber, and means simultaneously rotating said spool and actuating the gas introducing means whereby wire wound on said spool will be dispensed through said nozzle under tension on a stream of the gas.

2. A device for the continuous feeding of extremely fine wire comprising a housing, a wire carrying spool rotatably supported in said housing, a nozzle communicating with the interior of said housing, and means simultaneously rotating said spool and introducing gas under pressure into said housing whereby wire on said spool will be dispensed through said nozzle tensioned on a stream of gas.

3. The invention of claim 2 wherein said spool has a helically ground thread in the peripheral surface thereof for holding a single layer of wire with adjacent coils thereof axially spaced to prevent sticking of adjacent filaments of soft composition.

4. A continuous feeding device for dispensing extremely fine wire comprising a housing having a chamber therein, an outlet nozzle communicating with the chamber, a gas inlet communicating with the chamber, a wire carrying spool rotatably supported in said housing, hand-operated means advancing wire from said spool, and actuating means associated with said hand-operated means releasing gas under pressure into said inlet when the latter means is moved in a predetermined direction whereby wire on the spool will be dispensed therefrom under tension through said nozzle on a stream of air.

5. The invention of claim 4 wherein said actuating means is inoperative when said hand-operated means is moved in the reverse direction to enable wire to be wound back on said spool when excessive lengths are delivered.

6. A device for the continuous feeding of extremely fine wire comprising a housing having a chamber therein, a wire carrying spool rotatably supported in said housing, a nozzle having a bore communicating with the chamber, means for introducing gas under pressure into the chamber, and means on said housing coupled with and rotating said spool whereby wire wound on said spool will be dispensed through said nozzle under tension on a stream of the gas.

7. The invention of claim 6 wherein the means rotating said spool actuates the gas introducing means when rotated in a preferential direction.

8. The invention of claim 7 wherein the means rotating said spool has a cam for actuating a switch on said gas introducing means, said cam having a slip clutch in engagement therewith to override the rotating means in either a clockwise or counterclockwise direction.

9. A device for the continuous feeding of extremely fine wire comprising a housing having a chamber therein, a spool rotatably supported within said housing, a nozzle having a bore communicating with the chamber, means for introducing gas under pressure into the chamber, and means rotating said spool and actuating said gas introducing means whereby wire wound on said spool will be dispensed through said nozzle under tension on a stream of gas.

10. The invention of claim 9 wherein said nozzle is glass and the bore thereof is flared at the end adjacent the chamber.

11. A device for the continuous feeding of extremely fine wire comprising a housing having a chamber therein, a shaft rotatable in said housing and projecting within the chamber, a spool detachably secured to said shaft and rotatable therewith, a nozzle detachably secured to said housing and having a bore communicating with the chamber, a transparent cover plate detachably secured to said housing over said chamber and defining a closure therefor, and means on said housing rotating said spool and introducing gas under pressure into the chamber whereby wire wound on said spool will be dispensed under observation through said nozzle on a stream of gas.

References Cited in the file of this patent

UNITED STATES PATENTS 1,800,922     Yancey _____ Apr. 14, 1931

FOREIGN PATENTS 959,672     Germany _____ Mar. 7, 1957